United States Patent
Maughan et al.

(10) Patent No.: US 10,936,646 B2
(45) Date of Patent: *Mar. 2, 2021

(54) SYSTEMS AND METHODS FOR ENHANCING SEARCH RESULTS BY WAY OF UPDATING SEARCH INDICES

(71) Applicant: Rovi Guides, Inc., San Jose, CA (US)

(72) Inventors: Benjamin H. Maughan, Pleasanton, CA (US); Paul Stathacopoulos, San Carlos, CA (US)

(73) Assignee: Rovi Guides, Inc., San Jose, CA (US)

( * ) Notice: Subject to any disclaimer, the term of this patent is extended or adjusted under 35 U.S.C. 154(b) by 206 days.

This patent is subject to a terminal disclaimer.

(21) Appl. No.: 16/199,865

(22) Filed: Nov. 26, 2018

(65) Prior Publication Data
US 2019/0171661 A1 Jun. 6, 2019

Related U.S. Application Data

(63) Continuation of application No. 14/634,678, filed on Feb. 27, 2015, now Pat. No. 10,140,299.

(60) Provisional application No. 62/098,519, filed on Dec. 31, 2014.

(51) Int. Cl.
| | |
|---|---|
| G06F 16/435 | (2019.01) |
| G06F 16/71 | (2019.01) |
| G06F 16/635 | (2019.01) |
| G06F 16/735 | (2019.01) |
| G06F 16/9535 | (2019.01) |
| G06F 16/2457 | (2019.01) |

(52) U.S. Cl.
CPC ...... *G06F 16/435* (2019.01); *G06F 16/24575* (2019.01); *G06F 16/635* (2019.01); *G06F 16/71* (2019.01); *G06F 16/735* (2019.01); *G06F 16/9535* (2019.01)

(58) Field of Classification Search
CPC ...... G06F 16/435; G06F 16/71; G06F 16/635; G06F 16/735; G06F 16/9535; G06F 16/24575; G06F 16/22; G06F 16/2272; G06F 16/31; G06F 16/328
See application file for complete search history.

(56) References Cited

U.S. PATENT DOCUMENTS

| | | | | |
|---|---|---|---|---|
| 7,254,580 B1* | 8/2007 | Gharachorloo | ..... | G06F 16/2471 |
| 7,293,016 B1* | 11/2007 | Shakib | ..... | G06F 16/951 |
| 8,554,759 B1* | 10/2013 | Annau | ..... | G06F 16/22 707/711 |
| 2005/0102270 A1* | 5/2005 | Risvik | ..... | G06F 16/951 |
| 2008/0307009 A1* | 12/2008 | Anderson | ..... | G06F 16/2272 |
| 2010/0250504 A1* | 9/2010 | Balasubramanian | ..... | G06F 16/2272 707/696 |
| 2011/0078135 A1* | 3/2011 | Whitehead | ..... | G06F 16/2272 707/715 |

(Continued)

*Primary Examiner* — David T. Brooks
(74) *Attorney, Agent, or Firm* — Haley Guiliano LLP

(57) ABSTRACT

Systems and methods are described herein for efficiently providing personalized search results to a user. Personalized search allows a user to receive search results that are most relevant to that user. For example, when a user with a strong interest in rap searches for "50 cent" they may be presented with top search results corresponding to 50 Cent's rap albums. Conversely, when a coin collector searches for "50 cent" they may be presented with top search results containing antique coins.

20 Claims, 5 Drawing Sheets

(56) References Cited

U.S. PATENT DOCUMENTS

| | | | |
|---|---|---|---|
| 2016/0092577 A1* | 3/2016 | Srivastava | G06Q 30/00 707/732 |
| 2016/0132502 A1* | 5/2016 | Balasa Ramnath | G06F 16/284 707/689 |
| 2016/0146623 A1* | 5/2016 | Ren | G06F 16/9535 701/400 |

* cited by examiner

SYSTEMS AND METHODS FOR ENHANCING SEARCH RESULTS BY WAY OF UPDATING SEARCH INDICES

CROSS REFERENCE TO RELATED APPLICATION

This application is a continuation of U.S. patent application Ser. No. 14/634,678, filed Feb. 27, 2015 (currently allowed), which claims the benefit of U.S. Provisional Application No. 62/098,519, filed Dec. 31, 2014, all of which are hereby incorporated by reference herein in their entities.

BACKGROUND OF THE INVENTION

Conventional searching methods may provide results to a user in a non-individualized manner. A search may be performed on a large generalized dataset, which, in addition to providing broad results, takes a long time to find results. Search results may contain information that is not pertinent to the user. As a result, the user must either spend time manually searching through the results to find the information they need or must perform a subsequent search to narrow down the results to what they are looking for.

SUMMARY

Systems and methods are described herein for efficiently providing personalized search results to a user. Personalized search allows a user to receive search results that are most relevant to that user. For example, when a user with a strong interest in rap searches for "50 cent" they may be presented with top search results corresponding to 50 Cent's rap albums. Conversely, when a coin collector searches for "50 cent" they may be presented with top search results containing antique coins.

As an example, when performing a search, a user may first enter a search query on a device. This may, for example, be the string "50 Cent". The user may then be identified by a user profile. The profile may contain data associated with the user such search history or demographic data. Data in the profile may be compared against generalized global profiles aiming to capture the interest of a segment of users. For example, different global profiles may represent a subset of the population who likes rap music, likes horror movies and likes both rap music and horror movies. Each of these segments may be represented by a database profile, wherein the database profile is a unique identifier for the traits and preferences of people in the segment. Subsets of data containing fingerprints may be associated with a database profile, such that data that is most relevant to the users whose traits are represented by the database profile is in a first subset and data that is less relevant is in a second subset. For example, a database profile representing traits of people who like rap music may identify a first subset of data containing rap artists and albums. A second subset of data may contain classical music, since classical music may not be liked by people who like rap music. Data in each subset may be indexed to allow for quick searching. The first subset of data may be associated with a first index and the second subset may be associated with a second index. Control circuitry may search for data matching the query in data associated with the first group. Results of the search may be presented to the user on a display device. Subsequent to performing the search on the first group of data, control circuitry may search the second group of data.

In some aspects, control circuitry may receive a search query containing a symbol. For example, control circuitry may receive a query containing the string "50 cent" from a user. The query may be received via a user input device such as a keyboard, touchscreen or microphone. In some aspects, control circuitry may retrieve a profile associate with the user. For example, control circuitry may access a local or remote database to retrieve data containing the user's search history or data explicitly provided by the user indicating preferences or demographic information. In this example, control circuitry may retrieve a profile containing data indicating that a user has a preference for rap music.

In some aspects, control circuitry may identify a database profile from a selection of multiple database profiles best matching data in the profile of the user. For example, control circuitry may access a database of database profiles, wherein a database profile represents a generalized global profile (i.e., traits, demographics, preferences etc.) for a segment of the population. As an example, control circuitry may compare the data in the user's profile against the data associated with the plurality of database profiles and may identify that the user's profile data best matches the data associated with the database profile representing the traits of the population of people who like rap music.

In some aspects, control circuitry may identify a first and a second index associated with the database profile. For example, control circuitry may access data associated with the first index that is most relevant to users whose traits are represented by the database profile. In this example, control circuitry may access data in the first index such as data representing rap artists 50 Cent and Biggie Smalls and rap albums such as "Illmatic" and "Straight Outta Compton". Control circuitry may be able to access data less relevant to the user by accessing the second index. In this example, control circuitry may access data in the second index representing antique 50 cent coins and Mozart's music, both of which may not be popular among people who like rap music.

In some aspects, control circuitry may search for data corresponding to the first index while refraining from searching for data corresponding to the second index. For example, control circuitry may search for data matching the symbol "50 cent" in only the first index and may find data such as 50 Cent albums "Curtis" and "The Massacre" in the first index. In some aspects, control circuitry provides the search results to the user when results are found. For example, control circuitry may display a listing of the results, such as "Curtis" and "The Massacre" on a screen of a user equipment device. Alternatively, control circuitry may generate an audio signal for playback on speakers of the user equipment device to dictate the search results to the user.

In some aspects, control circuitry may search the second index subsequent to searching the first index. For example, after control circuitry presents the search results to the user as described above, control circuitry may search for data matching the symbol "50 cent" corresponding to the second index.

In some aspects, control circuitry may perform searching for data corresponding to the second index in parallel to providing the search result to the user. For example, control circuitry may present the results corresponding to the search of the first index while searching for data corresponding to the second index. In some aspects, control circuitry may present search results to the user while continuing to perform the search (i.e., simultaneously searching and presenting). For example, control circuitry may present a result immediately as it is found while continuing the search.

In some aspects, control circuitry may determine attributes corresponding to each search result and group each search result into a respective group based on the attributes. Control circuitry may receive search results containing attribute information about each result. For example, control circuitry may receive search results and attribute information identifying "The Massacre" and "Curtis" as albums and "In Da Club" and "Candy Shop" as songs, responsive to the search for "50 cent". Control circuitry may present album results in a first grouping and song results in a second grouping. The groupings may be identified by unique titles (e.g., a title indicating a group for albums and a group for songs) or different modes of presentation (e.g., songs may be presented bolded and underlined, albums may be presented as an album cover concurrently with additional metadata received by control circuitry such as album release date or genre).

In some embodiments, control circuitry may identify attributes corresponding to the search symbol to identify a best match database profile. For example, control circuitry may access attributes associated with the search symbol containing the string "Who is 50 cent?". Control circuitry may process the string and may determine that the search is for a person named "50 cent". In some embodiments, control circuitry may identify a database profile of a plurality of database profiles, that with respect to each database profile of a plurality of database profiles, best matches data of the user profile and attributes corresponding to the search symbol. For example, control circuitry may access a database profile representing celebrities or other people associated with the rap world, since control circuitry determined the user has a preference for rap and that the search query is for a person.

Methods and systems are also provided herein for updating search indices to contain data that is most relevant to a group of users. A database profile may be identified from a plurality of database profiles representing common user profile traits of a segment of users. For example, the database profile may represent the traits of users who like rap music. Control circuitry may receive search queries containing a common symbol from users of this segment, such as a query for the "Legally Blonde Soundtrack". Data corresponding to the first index is searched for matches of the common symbol. If control circuitry determines that the search yields insufficient results, data corresponding to the second index is searched. As an example, data corresponding to the "Legally Blonde Soundtrack" may be located in the second index as the segment of users who like rap music may not like the music from "Legally Blonde". Searching the first index for "Legally Blonde Soundtrack" would yield insufficient results. After determining a threshold number of searches for the common symbol, "Legally Blonde Soundtrack", to the second index yield sufficient results; data from the second index may be updated to the first index.

In some embodiments, control circuitry may identify a database profile from a plurality of database profiles that represents common user profile traits of a segment of users. The database profile may identify a first and a second index. Following from the previous example, control circuitry may access a database profile (e.g., from a local or remote database) that identifies a first index corresponding to data most relevant to the segment of the population who like rap music, such as rap artists and rap songs. The database profile may also identify a second index corresponding to data that is not as relevant to the users, such as classical music, assuming classical music is not liked by the segment of the population who like rap music.

In some embodiments, control circuitry may receive search queries from the segment of users represented by the database profile. For example, control circuitry may receive user input of a search query into a user input device such as a keyboard, touchscreen or microphone. Following with the previous example, control circuitry may receive, over a network, the aggregate search queries for the segment of users that like rap, containing a common symbol, such as "Legally Blonde Soundtrack".

In some embodiments, in response to receiving each search query, control circuitry searches data corresponding to the first index for data matching the symbol, while refraining from searching data corresponding to the second index. For example, control circuitry may receive searches containing the common search symbol "Legally Blonde Soundtrack". Control circuitry may access local or remote data corresponding to the first index and may conduct a search for "Legally Blonde Soundtrack". Control circuitry may refrain from accessing data corresponding to the second index while performing the search.

In some embodiments, control circuitry may determine that each search of the first index for data corresponding to the common symbol yields insufficient search results. Control circuitry may subsequently search data corresponding to the second index. For example, control circuitry may perform a search for the common symbol "Legally Blonde Soundtrack" on the data corresponding to the first index. Control circuitry may determine that the search results are insufficient because, for example, the amount of data returned by searching the first index may be below a threshold value. In response to this determining, control circuitry may access local or remote data corresponding to the second index and may perform a search for "Legally Blonde Soundtrack".

In some embodiments, control circuitry determines that a threshold number of search queries comprising the common symbol yields sufficient results when searching data corresponding to the second index. For example, control circuitry may find data corresponding to the "Legally Blonde Soundtrack" in the second index. Control circuitry may determine that the search results are sufficient, because, for example, the amount of data returned by searching the second index may be above a threshold value. Control circuitry may increment a counter every time searching the data corresponding to the second index for the symbol "Legally Blonde Soundtrack" yields sufficient results. After incrementing the counter, control circuitry may compare the counter value to a threshold value, wherein the threshold value represents a number of searches before data may be updated to the first index.

In some embodiments, control circuitry may update the first index to include data of the second index in response to determining that a threshold number of search queries comprising the common symbol yields sufficient results. For example, control circuitry may identify data corresponding to the search results to be updated to the first index. Control circuitry may copy the identified data from the data storage location of the second index to the data storage location of the first index. Control circuitry may add to the first index pointers to the identified data. Pointers to the identified data may be removed from the second index.

In some embodiments, control circuitry may determine the occurrence of a real world event and a plurality of attributes corresponding to the real world event. For example, control circuitry may access a local or remote database containing data indicating the beginning of a sports tournament, such as the World Cup. Control circuitry may access attributes of the World Cup, such as data about the teams that are participating, team rosters or play schedules. In some embodiments, control circuitry may identify data in the second index corresponding to an attribute of the plurality of attributes and may update the first index with data from the second index in response to the identifying. For example, control circuitry may identify data corresponding to sports teams playing in the World Cup in a second index that are not present in the first index. For example, control circuitry may update the index by performing any of the steps as described above.

In some embodiments, control circuitry may compare attributes associated with data that has not yet been placed in the first or second index to attributes associated with the database profile. For example, control circuitry may receive new data, such as data associated with new 50 Cent albums "Animal Ambition" which may not be associated with an index. Control circuitry may access attributes associated with the new data (i.e., "Animal Ambition" is a rap album by artist 50 Cent). In some embodiments, control circuitry will compare the attributes against attributes associated with the database profile. In response to determining that at least a first threshold value of the attributes associated with the data matches attributes associated with the database profile, control circuitry may update the first index to contain the data. For example, control circuitry may only find one search result and may compare this value against the first threshold value if one is at least the first threshold value, the first index will be updated with the new data. Alternatively, control circuitry may determine that the number of matches is a least a second threshold value, wherein the second threshold value is less than the first threshold value. In response to the determining, control circuitry may update the second index to contain the data. For example, control circuitry may determine that one search result is at least the second threshold value. In response to the determining, control circuitry may update the second index to contain the data.

In some embodiments, in response to receiving the user input, control circuitry may associate an entry of the first index that yielded a search result of the search results with a timestamp. Following with the previous example, a search of the first index for "50 Cent" may yield data corresponding to the music video for "Get Rich or Die Trying," which is a song authored by "50 Cent." Control circuitry may add a timestamp indicating the time the entry corresponding to the music video for "Get Rich or Die Trying" was last accessed by control circuitry in the first index. In some embodiments, control circuitry periodically compares the timestamp against a threshold timestamp. For example, control circuitry may traverse the first index and may access the timestamp values for all entries. Control circuitry may determine whether a timestamp is older than a threshold value. In response to determining that the timestamp is older than a threshold value, control circuitry may identify data that is older than the timestamp. In response to the identifying, control circuitry may update the second index to include the identified data of the first index. In some embodiments, control circuitry may remove data from the first index.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
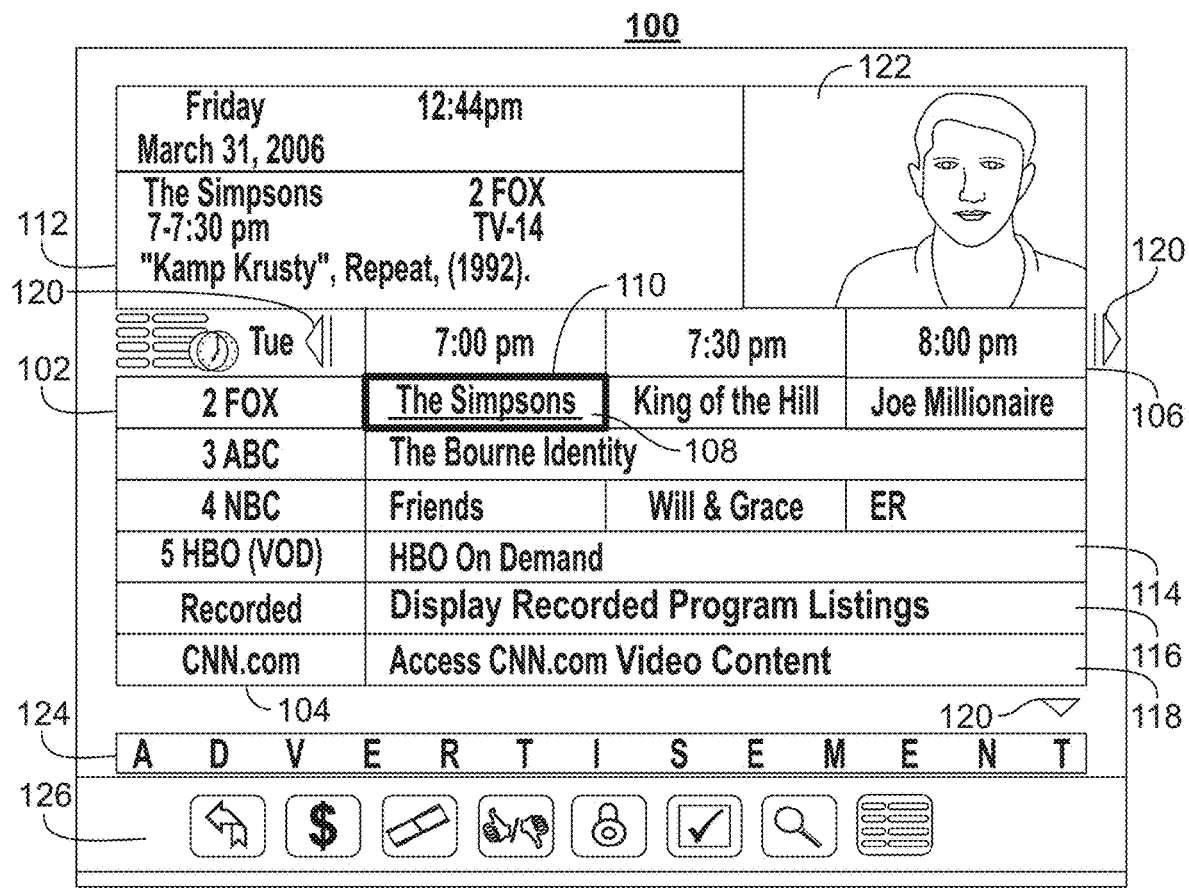
FIG. 1 shows an illustrative embodiment of a display screen that may be used to provide media guidance application listings and other media guidance information, in accordance with some embodiments of the disclosure.

Systems and methods are described herein for efficiently providing personalized search results to a user. Personalized search allows a user to receive search results that are most relevant to that user. For example, when a user with a strong interest in rap searches for "50 cent" they may be presented with top search results corresponding to 50 Cent's rap albums. Conversely, when a coin collector searches for "50 cent" they may be presented with top search results containing antique coins.

As an example, when performing a search, a user may first enter a search query on a device. This may, for example, be the string "50 Cent". The user may then be identified by a user profile. The profile may contain data associated with the user such search history or demographic data. Data in the profile may be compared against generalized global profiles aiming to capture the interest of a segment of users. For example, different global profiles may represent a subset of the population who likes rap music, likes horror movies and likes both rap music and horror movies. Each of these segments may be represented by a database profile, wherein the database profile is a unique identifier for the traits and preferences of people in the segment. Subsets of data containing fingerprints may be associated with a database profile, such that data that is most relevant to the users whose traits are represented by the database profile is in a first subset and data that is less relevant is in a second subset. For example, a database profile representing traits of people who like rap music may identify a first subset of data containing rap artists and albums. A second subset of data may contain classical music, since classical music may not be liked by people who like rap music. Data in each subset may be indexed to allow for quick searching. The first subset of data may be associated with a first index and the second subset may be associated with a second index. Control circuitry may search for data matching the query in data associated with the first group. Results of the search may be presented to the user on a display device. Subsequent to performing the search on the first group of data, control circuitry may search the second group of data.

In some aspects, control circuitry may receive a search query containing a symbol. For example, control circuitry may receive a query containing the string "50 cent" from a user. The query may be received via a user input device such as a keyboard, touchscreen or microphone. In some aspects, control circuitry may retrieve a profile associate with the user. For example, control circuitry may access a local or remote database to retrieve data containing the user's search history or data explicitly provided by the user indicating preferences or demographic information. In this example, control circuitry may retrieve a profile containing data indicating that a user has a preference for rap music.

In some aspects, control circuitry may identify a database profile from a selection of multiple database profiles best matching data in the profile of the user. For example, control circuitry may access a database of database profiles, wherein a database profile represents a generalized global profile (i.e., traits, demographics, preferences etc.) for a segment of the population. As an example, control circuitry may compare the data in the user's profile against the data associated with the plurality of database profiles and may identify that the user's profile data best matches the data associated with the database profile representing the traits of the population of people who like rap music.

In some aspects, control circuitry may identify a first and a second index associated with the database profile. For example, control circuitry may access data associated with the first index that is most relevant to users whose traits are represented by the database profile. In this example, control circuitry may access data in the first index such as data representing rap artists 50 Cent and Biggie Smalls and rap albums such as "Illmatic" and "Straight Outta Compton". Control circuitry may be able to access data less relevant to the user by accessing the second index. In this example, control circuitry may access data in the second index representing antique 50 cent coins and Mozart's music, both of which may not be popular among people who like rap music.

In some aspects, control circuitry may search for data corresponding to the first index while refraining from searching for data corresponding to the second index. For example, control circuitry may search for data matching the symbol "50 cent" in only the first index and may find data such as 50 Cent albums "Curtis" and "The Massacre" in the first index. In some aspects, control circuitry provides the search results to the user when results are found. For example, control circuitry may display a listing of the results, such as "Curtis" and "The Massacre" on a screen of a user equipment device. Alternatively, control circuitry may generate an audio signal for playback on speakers of the user equipment device to dictate the search results to the user.

In some aspects, control circuitry may search the second index subsequent to searching the first index. For example, after control circuitry presents the search results to the user as described above, control circuitry may search for data matching the symbol "50 cent" corresponding to the second index.

Methods and systems are also provided herein for updating search indices to contain data that is most relevant to a group of users. A database profile may be identified from a plurality of database profiles representing common user profile traits of a segment of users. For example, the database profile may represent the traits of users who like rap music. Control circuitry may receive search queries containing a common symbol from users of this segment, such as a query for the "Legally Blonde Soundtrack". Data corresponding to the first index is searched for matches of the common symbol. If control circuitry determines that the search yields insufficient results, data corresponding to the second index is searched. As an example, data corresponding to the "Legally Blonde Soundtrack" may be located in the second index as the segment of users who like rap music may not like the music from "Legally Blonde". Searching the first index for "Legally Blonde Soundtrack" would yield insufficient results. After determining a threshold number of searches for the common symbol, "Legally Blonde Soundtrack", to the second index yield sufficient results; data from the second index may be updated to the first index.

In some embodiments, control circuitry may identify a database profile from a plurality of database profiles that represents common user profile traits of a segment of users. The database profile may identify a first and a second index. Following from the previous example, control circuitry may access a database profile (e.g., from a local or remote database) that identifies a first index corresponding to data most relevant to the segment of the population who like rap music, such as rap artists and rap songs. The database profile may also identify a second index corresponding to data that is not as relevant to the users, such as classical music, assuming classical music is not liked by the segment of the population who like rap music.

In some embodiments, control circuitry may receive search queries from the segment of users represented by the database profile. For example, control circuitry may receive user input of a search query into a user input device such as a keyboard, touchscreen or microphone. Following with the previous example, control circuitry may receive, over a network, the aggregate search queries for the segment of users that like rap, containing a common symbol, such as "Legally Blonde Soundtrack".

In some embodiments, in response to receiving each search query, control circuitry searches data corresponding to the first index for data matching the symbol, while refraining from searching data corresponding to the second index. For example, control circuitry may receive searches containing the common search symbol "Legally Blonde Soundtrack". Control circuitry may access local or remote data corresponding to the first index and may conduct a search for "Legally Blonde Soundtrack". Control circuitry may refrain from accessing data corresponding to the second index while performing the search.

In some embodiments, control circuitry may determine that each search of the first index for data corresponding to the common symbol yields insufficient search results. Control circuitry may subsequently search data corresponding to the second index. For example, control circuitry may perform a search for the common symbol "Legally Blonde Soundtrack" on the data corresponding to the first index. Control circuitry may determine that the search results are insufficient because, for example, the amount of data returned by searching the first index may be below a threshold value. In response to this determining, control circuitry may access local or remote data corresponding to the second index and may perform a search for "Legally Blonde Soundtrack".

In some embodiments, control circuitry determines that a threshold number of search queries comprising the common symbol yields sufficient results when searching data corresponding to the second index. For example, control circuitry may find data corresponding to the "Legally Blonde Soundtrack" in the second index. Control circuitry may determine that the search results are sufficient, because, for example, the amount of data returned by searching the second index may be above a threshold value. Control circuitry may increment a counter every time searching the data corresponding to the second index for the symbol "Legally Blonde Soundtrack" yields sufficient results. After incrementing the counter, control circuitry may compare the counter value to a threshold value, wherein the threshold value represents a number of searches before data may be updated to the first index.

In some embodiments, control circuitry may update the first index to include data of the second index in response to determining that a threshold number of search queries comprising the common symbol yields sufficient results. For example, control circuitry may identify data corresponding to the search results to be updated to the first index. Control circuitry may copy the identified data from the data storage location of the second index to the data storage location of the first index. Control circuitry may add to the first index pointers to the identified data. Pointers to the identified data may be removed from the second index.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
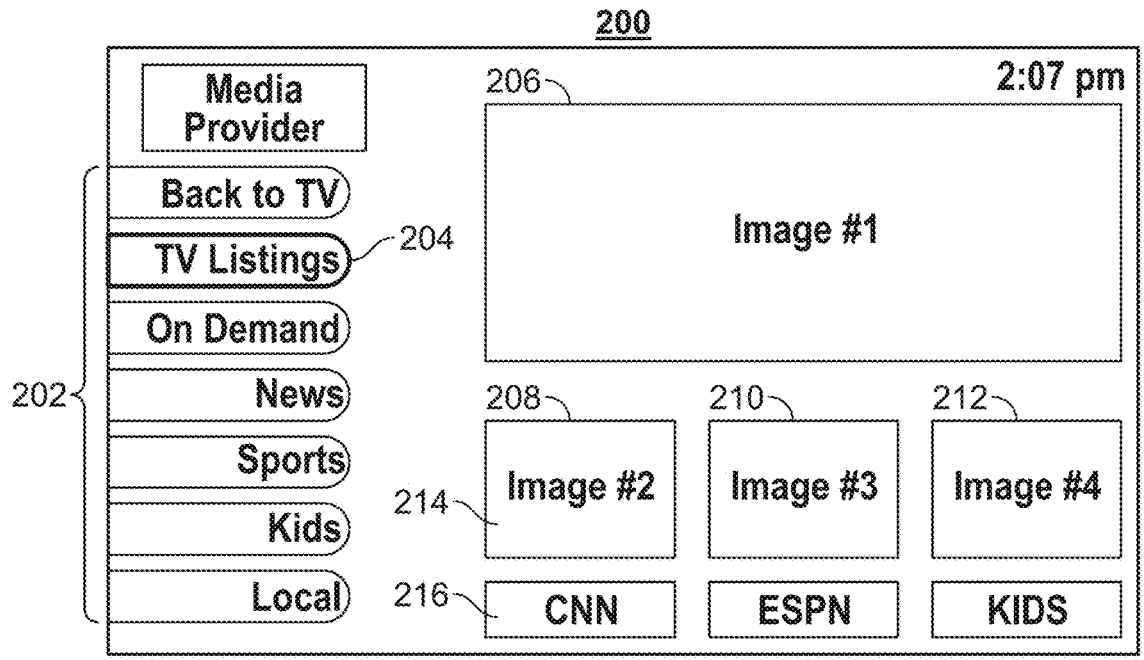
FIG. 2 shows another illustrative embodiment of a display screen that may be used to provide media guidance application listings, in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
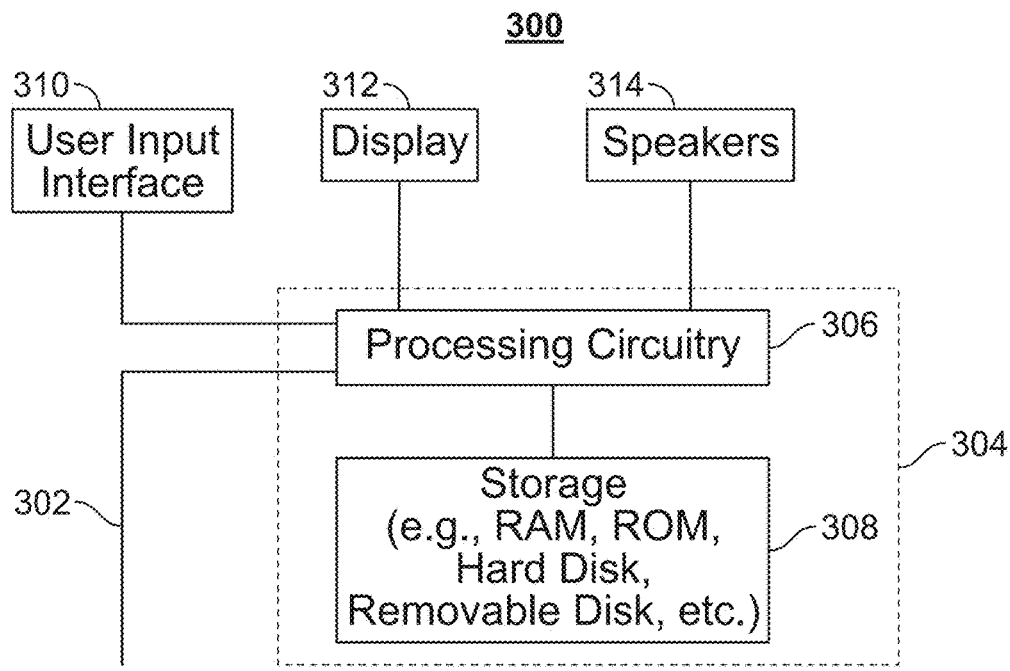
FIG. 3 is a block diagram of an illustrative user equipment (UE) device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
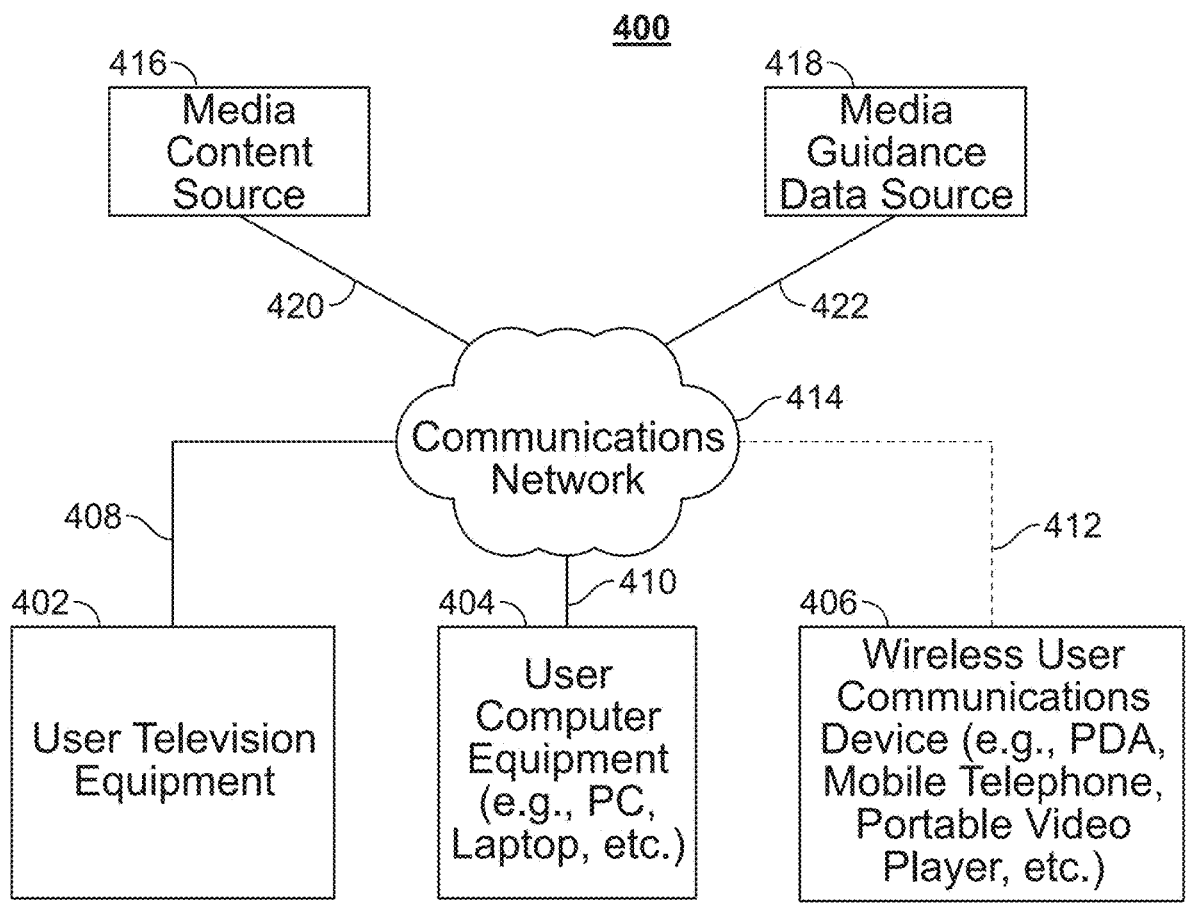
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

The term "symbol" as used herein is defined to mean any user input of any kind. Examples of symbols include text, including both a single word and strings of text, as well as images (e.g., photographs), audio (e.g., input via a microphone), video (e.g., input via a webcam or a video camera), gestures (e.g., rendered sign language), and the like.

The term "index" as used herein is defined to mean a data structure used to increase the speed for which data corresponding to the index can be searched and retrieved. The index may contain a listing of pointers to data that matches various search queries. Data referenced by the pointer may then be accessed by control circuitry (such as control circuitry 304). For example, indices may exist for genres of movies. A search for a horror movie may be received. An index for horror movies may contain a listing of pointers to all locations known to the control circuitry containing a horror movie. The index may be organized in a way such that all items may not need to be searched to return a result. For example, the index may break down the movies into further subcategories and indices like ghost movies and monster movies. Searching the index for a specific ghost movie would result in a search of only the ghost movie subcategory. The index may be a forward or inverted. Queries to the index may be modified to contain additional metadata based on processing of the original search query. For example, a natural language processing algorithm may process the query before it is sent to the index to derive meaning from the input. For example, a search for "Who is Mike Jones?" might be identified as a search for the person Mike Jones. Said meaning may be included as metadata sent to the index (e.g., data indicating that the search is for a person).

The term "segment" as used herein, is defined to mean a subset of the population having similar likes and interests. For example, a segment may be the group of users who enjoy listening to rap music. As another example, a segment may be the group of users liking comedy movies. Users may belong to more than one segment and different segments may have overlapping traits. For example, another segment may be the subset of the population liking both comedy movies and rap music. Users of this segment will also belong to the rap music and comedy movie segment.

The term "fingerprint" as used herein, is defined to mean data uniquely identifying content. For example, snapshots of all portions of a film may be taken to construct a fingerprint of a movie. Alternatively, samples from an audio signal may be taken to construct a song fingerprint. In another example a fingerprint may uniquely identify the content in a data file, regardless of the encoding format of the data file. For example, a fingerprint created for a MP3 encoded version of the song "In Da Club" by 50 Cent may have a same or similar fingerprint as a FLAC encoded version of the same song.

The term "database profile" as used herein, is defined to mean a unique identifier representing characteristics and traits that may be present in a profile. As such, a database profile can uniquely identify the tendencies and traits of a segment of users. For example, a segment of users that have a common interest of rap music may be represented by a unique database profile. The database profile may comprise user profile traits such as search histories, a liking for popular rap artists and associated albums, or a preference for rhythmic beats, which is present in many rap songs. A database profile may have associated data containing user profile traits, such as those mentioned above. A database profile may be associated with a group of data, such as content fingerprint data, such that a first group of data may contain data matching the traits and preferences represented by the database profile. A second group may contain all other data. The two groups of data may be indexed and uniquely structured to provide different results for a search comprising a common symbol. For example, a database profile representing traits of the segment of users who like rap music may identify a first index; said first index may identify data corresponding to rap song "In Da Club". The database profile may identify a second index, said second index identifying data for country song "Springsteen" (since it does not match any traits represented by the database profile).

The term "real-world event" as used herein, is defined to mean a happening or an occurrence that has occurred in reality rather than within a story. For example, a real world event could be an upcoming football game, changes in the stock market, celebrity gossip, headline news, a sale at a store or the weather.

In some embodiments, control circuitry (e.g., control circuitry 304) may receive user input comprising a symbol, such as a search comprising a string. Control circuitry 304 may retrieve a user profile associated with the user. Control circuitry 304 may identify a database profile, such that, with respect to all database profiles, the identified database profile best matches data of the user profile. Control circuitry 304 may identify a first and a second index associated with the database profile. In response to identifying the database profile, control circuitry 304 may search for data corresponding to the first index that matches the symbol while refraining from searching the second index. For example, control circuitry 304 may access the first index to perform a search on the index for data matching the symbol. When search results are found by control circuitry 304 based on searching for data corresponding to the first index, the results are provided to the user. For example, control circuitry 304 may generate for display on display 312 the results returned by the search. Subsequent to searching for data corresponding to the first index, control circuitry 304 may search for data corresponding to the second index that matches the symbol.

Figure 5:
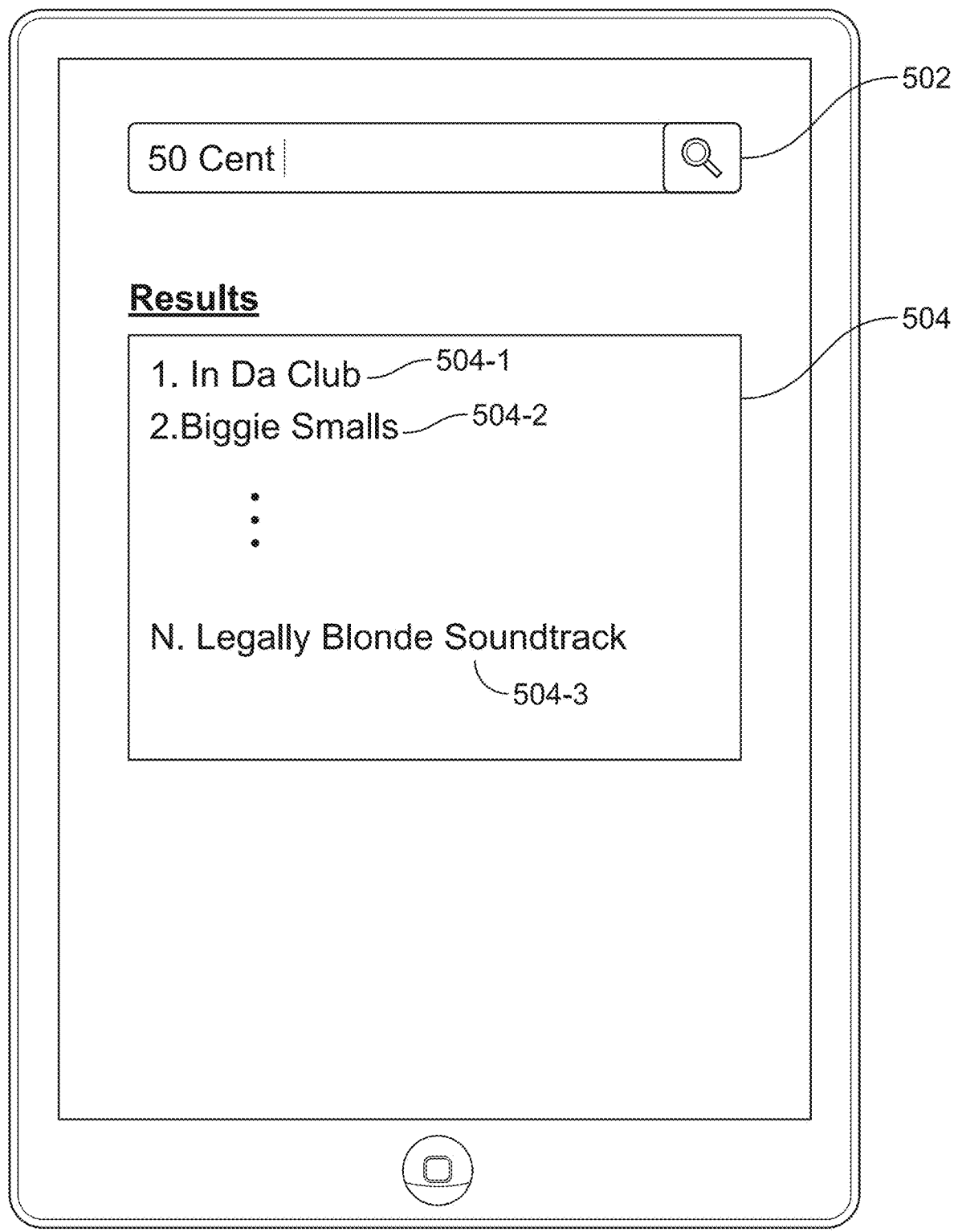
FIG. 5 shows an illustrative embodiment of user equipment device on which a search interface is displayed, in accordance with some embodiments of the disclosure.

FIG. 5 shows an illustrative embodiment of a user equipment device on which a search interface including search box 502 is displayed, in accordance with some embodiments of the disclosure. User equipment 500 is depicted as a mobile device, but may be any user equipment device, including user television equipment 402, user computer equipment 404, or wireless user communications interface 406.

In some embodiments, control circuitry 304 receives a symbol comprising a plurality of terms from a user. For example, control circuitry 304 may detect that a symbol has been input by a user into search box 502 (e.g, by way of user input interface 310). The symbol may comprise, for example, text, an image, a video, a gesture input, audio (e.g., voice input, and the like. Control circuitry 304 may prompt the user (e.g., via display 312) to input a symbol into search box 502, and may receive the user input of the symbol by way of a user's interaction with user input interface 310 (e.g., by receiving entry of a text string, by receiving input of an image or video by way of a drag and drop operation, and the like). As an example, control circuitry 304 may receive the symbol "50 Cent" via user input interface 310.

In some embodiments, control circuitry 304 may build, modify, or generate a user profile corresponding to the user inputting the search symbol (e.g., to populate a history of symbols input by a user into search box 502). Control circuitry 304 may determine whether a user profile exists by first identifying the user (e.g., login information, a picture of the user (e.g., gained through a webcam), or any other known identifying information of a user), and then by cross referencing the user's identity against entries of a database (e.g., storage 308 or media guidance data source 418). As a result of the cross-referencing, control circuitry 304 may receive a pointer to the user profile if one is located, or control circuitry 304 may receive a NULL value if the profile does not exist. The user profile database may, with respect to user equipment 500, on which control circuitry 304 may be located, be local (e.g., stored at storage 308) or remote (e.g., stored at media guidance data source 418, accessible via communications network 414). If control circuitry 304 determines that a user profile does not exist, control circuitry 304 may create a new profile for the user's identity, and control circuitry 304 may transmit a new entry request to the media guidance data source 418 such that the new profile corresponding to the user is stored. If control circuitry 304 determines that a profile for the user exists in the database (e.g., by detecting a preexisting profile stored at media guidance source 418), control circuitry 304 may update the user profile by adding the symbol to a search history entry field of the user's profile (e.g., via communications network 414 for a remote database at media guidance data source 418).

In an example, control circuitry 304, present in user device 500, may receive an input via user input interface 310 into search box 502 containing a symbol "50 Cent" as shown in FIG. 5. Control circuitry 304 may cross reference a local or remote database of user profiles (e.g., storage 308 or media guidance data source 418 accessible via communications network 414) to determine if the user's profile exists. Control circuitry 304 may send a request to create a new user profile to the media guidance data source 418 (e.g. via communications network 414 for remote databases). If control circuitry 304 determines that a profile is present at the database, the user's profile located in the database may be updated to contain the symbol "50 Cent" in the search history field of the user profile.

In some embodiments, control circuitry 304 may identify a database profile of a plurality of database profiles that, with respect to each database profile of the plurality of database profiles, best matches data of the user profile. Control circuitry 304 may need to process the user profile to determine a "best match" database profile. Control circuitry 304 may access database profiles at local or remote storage (e.g., in storage 308 or media data source 418 accessible via communications network 414). A database profile may be a unique identifier representing data corresponding to a profile that captures and represents the tendencies of a particular segment of the population, be it based on common preferences, demographics, or any other profile attribute. For example, a database profile may represent data corresponding to a profile that aims to capture the interests of a child. This profile may indicate interest in the media asset "Barney," a children's cartoon, and the genre "lullabies." Another database profile may represent data corresponding to a profile that aims to capture the interests of a person who enjoys heavy metal music; this profile indicate interest in artist "Metallica" and the restaurant "Hard Rock Café".

To find a "best match" database profile, control circuitry 304 may compute a user database profile based on the user's profile data to enable control circuitry 304 to quickly compare the user's profile to the plurality of database profiles. In some embodiments, control circuitry 304 may identify a database profile that best matches a user profile on various features of the user's profile, such as the user's search history, a number of times a user has searched a symbol, and the like. Following with the rap example, control circuitry 304 may compute a database profile by enumerating occurrences of rap artists and rap songs in the user's search history; the result of the enumeration may represent a portion of the database profile. For example, the database profile may be a 64 bit number where the first 4 bits represent the number of symbols related to the rap genre found in a search history of a user profile. Control circuitry 304 may perform a similar enumeration process for multiple genres until the database profile is fully generated. The enumerated values may be normalized to generate the final value of the database profile. Alternatively, a database profile may be represented by a multi dimensional data matrix. For example, control circuitry 304 may enumerate the search history to determine the both genre and search type (e.g. search type may be data identifying whether a search was for movies, music, webpages, articles etc.). Control circuitry 304 may follow a similar process for generating the database profile in the 3 dimensional case as in the 2 dimensional case by keeping one variable fixed. This is just an example of how control circuitry 304 may calculate a database profile; one skilled in the art will realize that more than three dimensions may be used.

In some embodiments, control circuitry 304 may include data corresponding to attributes of the search symbol in the database profile generation. For example, control circuitry 304 may process the search symbol to identify metadata or other characteristics about the search symbol. For example, control circuitry 304 may apply a natural language processing algorithm on the symbol to extract meaning. For example, control circuitry 304 may receive the search symbol "Where Brooklyn At?—Biggie". Using the natural language processing algorithm, control circuitry 304 may determine that the symbol is structured similarly to a search for a media asset (e.g., movie, show, article, song) and may therefore generate a database profile comprising the user's preferences for media assets. As an example, the database profile may have several bit positions reserved to indicate a search type (e.g., search for media assets). Control circuitry 304 may set the appropriate bits in the database profile indicative of a media search.

Control circuitry 304 may access a metadata database (e.g., storage 308 or media guidance data source 418) to get further information about the symbol. For example, control circuitry 304 may have determined via natural language processing that the query comprises two parts, "Where Brooklyn At?" and "Biggie". Control circuitry 304 may then query the metadata database with these two terms. Control circuitry 304 may retrieve data indicating that "Biggie" is a rapper and that "Where Brooklyn At?" is a rap freestyle. Following the exemplary database profile computation, control circuitry can update the rap genre portions of the database profile. Based on the determination by control circuitry 304 that the symbol is a rap freestyle, control circuitry 304 may update the database profile to indicate a search type of freestyle rap. Control circuitry 304 may additionally apply a higher or lower weighting to the metadata from the search symbol based on confidence of the natural language processing step. For example, control circuitry 304 may compute a sureness variable indicating the confidence in the parsed the symbol (e.g., a complex symbol containing sentence fragments may not be processed accurately and would therefore have low confidence). If control circuitry 304 determines that the confidence is below a threshold minimum confidence value, control circuitry 304 may not perform the updating. These are just exemplary embodiments of how a database profile may be generated and is merely illustrative; any information identifying a user's preferences based on a user profile may form a database profile.

Control circuitry 304 may compute a metric by which the user's database profile may be compared to the plurality of database profiles. Control circuitry 304 may access the plurality of database profiles of a database of database profiles stored locally or remotely (e.g., in storage 308 or media data source 418 accessible via communications network 414) before computing the metric. Control circuitry 304 may calculate a correlation coefficient between two profiles (e.g., based on genre counts in a database profile) to determine how close of a match the user's database profile is to another a database profile in the database. Control circuitry 304 may equate a "best match" database profile to the database profile with the closest correlation to the user's database profile.

In another example, control circuitry 304 may compute a similarity transform to compare database profiles composed form matrices. Control circuitry 304 will be able to infer the similarity between two matrices based on the conjugation. As an example, control circuitry 304 may compute a correlation for the user's database profile with each of the plurality of database profiles stored in the database. For each correlation, control circuitry 304 may store results locally or remotely (e.g., in storage 308 or media data source 418 accessible via communications network 414) of the correlation computation. After control circuitry 304 computes the correlation for all profiles, control circuitry 304 may evaluate the results to identify a database profile with the highest correlation. Following with the previous example, the user's database profile will most likely be a best match for the database profile representing data for the segment of the population who like rap music. This embodiment of how a similarity between two profiles may be calculated is merely illustrative; any calculation used to evaluate the similarity of profile data may be used.

In some embodiments, control circuitry 304 may access a first and second index identified by the best match database profile. Control circuitry 304 may be faced with a plurality of databases (e.g., media content source 416 and media guidance data source 418 accessible via communications network 414) and database indices, wherein the databases and indices are each associated with a database profile, and any of which may be searched, where each database and index is structured differently and likely to provide a different set of search results responsive to the search. Control circuitry 304 may use the index to facilitate fast and accurate retrieval of search results. The indices may be structured such that genres, artists, and the like, that frequently appear in the profiles of users corresponding to the matched database profile are present in the first index. Items that appear less frequently or not at all may appear in a second index. While a two-index structure is discussed in this disclosure, any number of indices may be used, and each index may include any number of data. Following with the previous example, control circuitry 304 may access search results containing rap songs and artists in the first index. In the second index, control circuitry 304 may access search results containing country music artists and songs, perhaps because users who enjoy rap music do not tend to enjoy country music. A search for the symbol "sunshine" in the first index may return the song "Sunshine" by the hip hop group Atmosphere and the like. Alternatively, a database profile identifying with the segment of the population who are nature lovers may contain nature documentaries and gardening videos in the first index. The lowest index may contain rap music and artists. As a counter example to the above, a search for "sunshine" in a first index corresponding to the nature lover's database profile may return a video related to home gardening and the like.

In some embodiments, in response to identifying the database profile, control circuitry 304 may perform a search for data corresponding to the first index that matches the symbol while refraining from searching data corresponding to the second index. For example, control circuitry 304 may search the first index by querying terms identical or similar to a search symbol (e.g., by sending a request to storage 308 or media guidance data source 418, accessible via communications network 414), and, if a match or matches are found, the result(s) associated with the symbol may be returned to control circuitry 304 via communications network 414.

As another example, control circuitry 304 may first process the search symbol to extract meaning or retrieve metadata as described above. For example, control circuitry 304 may use the inferred meaning of the search symbol to generate the query. For example, a search symbol "Who is 50 Cent?" may be identified by control circuitry 304 as a search for the person 50 Cent and not necessarily a search for the terms "who", "is" and "50 Cent". As an example, control circuitry 304 may then generate queries to search for data corresponding to people matching "50 Cent".

In response to the query, control circuitry 304 may receive the results as packets or messages containing the identified data (e.g., data from a mp3 file of "In Da Club" by 50 Cent) or control circuitry 304 may receive a pointer to the location that data associated with the results is stored (e.g., pointer to a location at storage 308 or media guidance data source 418). As another example, control circuitry 304 may generate a query or a sequence of queries related to the symbol to find results sequentially (e.g., return one result at a time) or in groups of results (e.g., return a group of results when matching is complete). For example, control circuitry 304 may generate a query containing a specific lyric to a 50 Cent song. Control circuitry 304 may only find results corresponding to the identified song. Alternatively, control circuitry 304 may generate a query searching for rappers from New York. Control circuitry 304 may return a group that exists in the index, or is created dynamically by control circuitry 304 corresponding to rappers in New York. Control circuitry 304 may create the group dynamically by searching for data matching both "rappers" and "New York" and temporarily storing search results in storage 308 or media guidance data source 418. Control circuitry 304 may retrieve the group of results when the searching is completed.

In a different example, control circuitry 304 may analyze the search results to determine appropriate groupings for presentation. In some embodiment, control circuitry 304 may process the attributes associated with the search results and may store results with matching attributes in similar groups. For example, control circuitry 304 may find search results related to the symbol "50 Cent" that are movies, songs etc. Control circuitry 304 may group movie results together and song results together to provide them to the user in groups.

In some embodiments, when search results are found based on the searching for data corresponding to the first index, control circuitry 304 provides them to the user. Following with the previous example, control circuitry 304 may present to the user the results of the search for "50 Cent" (e.g. via display 312, in results box 504). Control circuitry 304 may generate a list or a mosaic or similar within display box 504 to present the search results. As an example, Control circuitry 304 may generate for display the 50 Cent song "In Da Club" 504-1. Control circuitry 304 may also generate for display a plurality of other items from the first index such as the artist "Biggie Smalls" 504-2, the movie "8 Mile" or the dance "Shmoney Dance" as they relate to the search "50 Cent". In this example, the database profile represents a strong preference for rap, therefore, artists, music and the like, relating to rap will be in the first index. When control circuitry 304 searches for "50 Cent" the first hit may be rapper "50 Cent", as opposed to a 50 cent coin. Control circuitry 304 may receive symbols from the first index that are both related to rap and "50 Cent" the rapper, such as "Biggie Smalls", a fellow rapper, "8 Mile" a movie featuring a 50 Cent song, and the "Shmoney Dance" a related rap/hip hop dance. Although "50 Cent" may also refer to a coin, this may not appear in the first index as a "50 cent" coin currently has no relevance in the rap world. Alternatively, control circuitry 304 may generate an audio signal comprising data from the search results to present to the user via speakers 314. Alternatively, control circuitry 304 could present results in groups, such that movies are presented together and songs are presented together etc.

In an alternate example, control circuitry 304 may identify the user of user equipment 500 as a coin collector by accessing a user profile as described above. Control circuitry 304 may receive the symbol "50 cent" via user input interface 310. Control circuitry 304 may query the profile database for the user's profile and may create a database profile of the profile. In this example, control circuitry 304 may compute a database profile for the profile at least partially relying on the symbol "50 cent". As the user profile in this example contains the symbol "50 cent" and also may contain strong preference for rare coins and metals, control circuitry 304 may determine that a database profile related to a coin collection may be the "best match". Control circuitry 304 may present to the user the results of the search in results box 504 (e.g., by way of display 312). Control circuitry 304 may display results such as rare 50 cent coins or golden bullions, both of which may be located in the first index. In this manner, control circuitry 304 may quickly and accurately provide results that are customized for and most relevant to the user's preferences through use of the indices.

In some embodiments, subsequent to searching for data corresponding to the first index that matches the symbol, control circuitry 304 searches for data corresponding to the second index. For example, control circuitry 304 may only perform a search for data corresponding to the second index after a search for data corresponding to the first index is performed. Control circuitry 304 will then perform the same searching steps as described above. Control circuitry 304 may perform the searching of the second index while the results from the search of the first index are provided to the user. Alternatively, searching the second index may not be performed unless user input is received (e.g. via user input interface 310) requesting subsequent searching.

In some embodiments, control circuitry 304 may perform the searching for data corresponding to the second index in parallel to providing search results to the user. Doing so would enable a user to view some results of a search (e.g., by viewing results box 504 via display 312) while control circuitry 304 completes a search of the lower indices. In some embodiments, control circuitry 304 may temporarily store search results from completing a search of the lower indices in storage 308. Control circuitry 304 may cause the stored results to be displayed on display 312 (e.g., in results box 504) if control circuitry 304 receives a request to display more results (e.g. input via user input interface 310). In another example, control circuitry 304 may simultaneously display results from multiple indices in results box 504.

In some embodiments, control circuitry 304 may, in response to finding a first search result of the search results, present the first search result to the user while continuing to perform searching for data corresponding to the first index. Doing so would enable a user to view partial results of a search (e.g., by viewing results box 504 via display 312) while control circuitry 304 completes a search of the first index. For example, as control circuitry 304 finds search results, the search results are presented to the user (e.g. via display 312 in results box 504).

Sometimes the search results provided by static categorization based on profile traits is not sufficient. A user may want results that are more relevant and up to date with users of similar interests. For example, a user that likes classical music may never search for metal artist Metallica. However, after a song collaboration with classical cellist Yo-Yo Ma, Metallica is now a popular search for classical music lovers. Using a standard profile based approach would not update the indices to capture this new information.

In some embodiments, control circuitry 304 may identify a database profile of a plurality of database profiles that represents common user profile traits of a segment of users, wherein the database profile identifies a first index and a second index. For example, control circuitry 304 may identify a database profile corresponding to users who like classical music. Control circuitry 304 may identify a database profile of the plurality of database profiles and may access a first and a second index corresponding to the database profile. Control circuitry 304 may access a local or remote database containing the database profiles (i.e., storage 308 or media guidance data source 418). For example, control circuitry 304 may access a database profile in response to detecting a user input through user input interface 310 containing requesting a search. Control circuitry 304 may receive additional data (e.g. in a separate packet or communication, or as a part of the original search request) contained in the search explicitly identifying the database profile whose indices are to be searched by control circuitry 304. In an example, control circuitry 304 may be assigned to manage the indices for a specific database profile. In an example, control circuitry 304 may identify the database profile by identifying the user submitting the search request, accessing a profile for the user, and finding a best match profile as previously described. As another example, control circuitry 304 may access a database profile to perform an update on one or more of the indices. When control circuitry 304 performs an update on an index, control circuitry 304 may rearrange data in the index, and/or may add or remove data from the index. Control circuitry 304 may receive an update request via user input interface 310 or via communications network 414. Alternatively, control circuitry 304 may schedule an update task so that the indices are updated at regular intervals.

In some embodiments, control circuitry 304 receives search queries from a plurality of users of the segment comprising a common symbol. Control circuitry 304 may receive search queries from local users of user equipment device 500 via input into user input interface 310. In another example, control circuitry 304 may receive queries remote from user equipment device 500 via communications network 414. Control circuitry 304 may receive the search queries by accessing local or remote database or data store of search queries (i.e., storage 308 or media guidance data source 418). As an example, control circuitry 304 may receive symbols from the searches of all users who fingerprint classical music, wherein the symbol comprises the common symbol "Metallica". In another example, control circuitry 304 may receive a symbol comprising a portion of media. For example, control circuitry 304 may receive a first symbol containing an audio signal of the first 4 seconds of the song "Enter Sandman". Control circuitry 304 may receive a second symbol containing an audio signal of the last 10 seconds of the song "Enter Sandman". In some instances, control circuitry 304 may identify the first and the second symbol as a common symbol.

In another embodiment, control circuitry 304 may access a database (e.g., remote or local to user equipment 500 (e.g., storage 308 or media guidance data source 418)) to store additional metadata about the search query. As an example, control circuitry 304 may store metadata such as origin, time the query was placed, the name or an identifier of the user making the query, etc. Control circuitry 304 may make a determining based on the metadata as to the location that control circuitry 304 will store the search symbol. For example, control circuitry 304 may store search symbols for users between 18 and 25 years of age together. Over time, control circuitry 304 may determine that there are enough search queries to create a new database profile for, for example, the age group between 18 and 25. Control circuitry 304 may make this determining by evaluating whether the number of common search symbols corresponding to this group is greater than a threshold value. If so, control circuitry 304 may make a new database profile.

In some embodiments, control circuitry 304 may search for data corresponding to the first index that matches the symbol while refraining from searching data corresponding to the second index. For example, control circuitry 304 may search the first index by querying for terms identical or similar to a search symbol (e.g., by sending a request to storage 308 or media guidance data source 418, accessible via communications network 414), and, if a match or matches are found, the result(s) associated with the symbol may be returned to control circuitry 304 via communications network 414. As an example, control circuitry 304 may receive data associated with the results (e.g., portions of a Metallica mp3) or may receive a pointer to the location that data associated with the results is stored (e.g., from storage 308 or media guidance data source 418). In another embodiment, control circuitry 304 may form groups of results for presenting to the user.

In some embodiments, control circuitry 304 may determine that the searching for data corresponding to the first index yields insufficient search results. Control circuitry 304 may perform a search of the first index as described above. As an example, control circuitry 304 may generate multiple queries based on the search symbol "Metallica". As Metallica is not typically popular among the segment of the population who like classical music, control circuitry 304 may either return no results or may return very few results from searching the first index. Control circuitry 304 may compare the number of results to a threshold number to determine whether the searching yielded sufficient results. Control circuitry 304 may access storage 308 or media guidance data source 422 to store an indicator that the search results to the first index yielded insufficient results. Alternatively, control circuitry 304 may store an indicator that results were sufficient when it holds true. In some embodiments, control circuitry 304 presents the results to the user after determining that the search of the first index yields sufficient results. In response to the determining that searching the first index yields insufficient results, in some embodiments, control circuitry 304 may search the second index. Control circuitry 304 may perform the search as described above.

In some embodiments, control circuitry 304 enumerates the number of times searches for the common symbol in the second index yields sufficient results. Control circuitry 304 may perform a search of the second index for the symbol "Metallica" as described above. Control circuitry 304 may find results in the second index corresponding to Metallica as it is not very popular among the segment of the population that likes classical music. Similar to the first index, control circuitry 304 may determine whether the search results were sufficient. For example, control circuitry 304 may compare the number of search results and to a minimum threshold number of results (results threshold) to determine if the results are sufficient. Control circuitry 304 may set the threshold value via user input through user input interface 310, or control circuitry 304 may dynamically calculate the threshold (e.g., based on the total number of searches).

Control circuitry 304 may modify a value indicating that the search to the second index for the common symbol provided sufficient results. The results threshold for the second index need not be the same as the results threshold for the first index. Control circuitry 304 may search the second index and return more results than required by the results threshold. Control circuitry 304 may increment, in a database, a value indicating that the search for "Metallica"

yielded sufficient results. Control circuitry 304 may compute whether the incremented value is greater than the threshold number of search queries. In some embodiments, control circuitry 304 may present to the user results from the search. For example, control circuitry 304 may generate a list of results for display in results box 504 on display 312 of user equipment device 500. In some embodiments, control circuitry 304 may present the results to the user as they are found.

In some embodiments, control circuitry 304 updates the first index to include data of the second index in response to determining that searching for data comprising the common symbol yielded sufficient results. Control circuitry 304 may identify data corresponding to the second index to be updated to the first index. For example, control circuitry 304 may update the first index to correspond to data returned by searching for "Metallica". Alternatively, control circuitry 304 may select a subset of the search results that get updated to the first index. For example, control circuitry 304 may only select the first N results to get updated to the first index, where N is a whole number. Alternatively, results that get updated to the first index may be pseudo-randomly selected from the search results, or selected from other data corresponding to the search symbol. Control circuitry 304 may update the first index by adding new pointers to the data corresponding to the search results. By updating the first index control circuitry 304 may also remove pointers from the second index corresponding to the search results. Control circuitry 304 may also move the data from a database corresponding to the second index to a database corresponding to the first index.

In some embodiments, control circuitry 304 may update the first or second index when new data is available. For example, control circuitry 304 may not be able to find data corresponding to a first or second index matching the symbol "Metallica". In some embodiments, control circuitry 304 identifies attributes associated with data to determine whether indices should be updated. Control circuitry 304 may access a database of attribute data (e.g., local storage 308 or media guidance data source 418 accessible over communications network 414), to retrieve attributes associated with the data. For example, a control circuitry 304 may search the attribute database for data matching "Metallica". Control circuitry 304 may find data associated with "Metallica" indicating that it is a metal band, a listing of songs and band member names. Alternatively, control circuitry 304 may search the attribute database for "Apple". Control circuitry 304 may find data associated with "Apple" indicating that it is a fruit, its red, and is an ingredient in an apple pie. The database associated with attribute data may be very limited and may not be able to provide full search results. Control circuitry 304 may process the attribute data to determine whether the first or second index should be updated to contain the new data.

Control circuitry 304 may determine the index that will get updated with the new data by comparing the attributes of the new data to the attributes represented by the database profile. If control circuitry 304 determines that the number of attributes matching database profile attributes is below a threshold, the data will be updated to the second index. Otherwise the data may be updated the first index. For example, control circuitry 304 may compare the received attribute data for "Metallica" to the attribute data associated with the traits of the represented by the database profile. Alternatively, control circuitry 304 may compare the received attribute data to common attributes of fingerprints associated with the database profile. In the comparison, control circuitry 304 may enumerate the matches. If control circuitry 304 determines that the matches are below a threshold number, control circuitry 304 will update the second index with the data, otherwise, control circuitry 304 will update the first index with the data.

In some embodiments, control circuitry 304 may determine the occurrence of a real-world event and a plurality of attributes corresponding to the real-world event to update the first index to include data from the second index. In some embodiments, control circuitry 304 may determine the occurrence of a real-world event by accessing a database containing data corresponding to real-world events. For example, control circuitry 304 may identify a real-world event such as an upcoming concert for a musical artist or the Super Bowl. Control circuitry 304 may access a local or remote database (i.e. storage 308 or media guidance data source 418) containing a listing of real-world events. Control circuitry 304 may also access attribute data associated with the events described above. Control circuitry 304 may compare attribute data for data corresponding to the second index with attribute data of the real world event. For example, the second index identified by a database profile may correspond to soccer broadcast data. Control circuitry 304 may detect an event, such as an upcoming World Cup, an may update the first index to include data corresponding to the World Cup to anticipate that users will be sending search requests related to the World Cup in the coming days.

In some embodiments, control circuitry 304 may record a timestamp associated with an index entry whenever a search yields results. For example, control circuitry 304 may perform a search on data corresponding to a first index matching a symbol such as "Metallica". If control circuitry 304 finds data matching the symbol, control circuitry 304 will update the corresponding entry in the first index to include a timestamp. In some embodiments, control circuitry 304 may compare the timestamps of the entries in first index to a threshold timestamp, wherein the threshold timestamp indicates a time when data should be updated by control circuitry 304 to the second index. In response to identifying data corresponding to the first index with a timestamp older than the threshold timestamp, in some embodiments, control circuitry 304 may update the second index to include data of the first index. In some embodiments, control circuitry 304 may remove an entry from the first index after control circuitry 304 updates the entry to the second index. Following with the World Cup example, control circuitry 304 may compare the timestamps of entries in the first index long after the World Cup has finished. Control circuitry 304 may detect that users are no longer accessing data associated with the World Cup (e.g. the timestamp on the World Cup entry is older than the threshold value) and may update the second index to include entries associated with the World Cup that are older than the threshold amount. Control circuitry 304 may remove entries associated with the World Cup corresponding to the first index.

In some embodiments, control circuitry 304 may perform a search on data corresponding to a second index matching a symbol. If control circuitry 304 finds data matching the symbol, control circuitry 304 may update the corresponding entry in the second index to include a timestamp. In some embodiments, control circuitry 304 may compare the timestamp of entries in the second index to a threshold timestamp, wherein the threshold timestamp indicates a time when data should be updated by control circuitry 304 to the first index. The value of the threshold timestamp may be a predefined value, such as a value entered by a user into user input interface 310. Alternatively, control circuitry 304 may compute the threshold timestamp based on the timestamps in the first index. For example, control circuitry 304 may set the threshold to a value such the ten most recently accessed items are moved to the first index. In response to identifying data corresponding to the second index with a timestamp greater than the threshold timestamp, in some embodiments, control circuitry 304 may update the first index to include data of the second index. The updating may take place similarly as described above.

In some embodiments, control circuitry 304 presents the search results to the user before updating the indices. Control circuitry 304 may update data from the second index to the first index based on any of the methods mentioned above. For example, control circuitry 304 may receive a common symbol "Legally Blonde Soundtrack" from users a segment of users who like rap music. Control circuitry 304 may identify a database profile representing the common user traits of the segment of users (e.g., rap music and rap artists etc.). The database profile may identify a first and a second index. Control circuitry 304 may search data corresponding to the first index and may find insufficient results (e.g., too few results, or no results). Control circuitry 304 may search the data corresponding to the second index and may find sufficient results (e.g., a number of results greater than a threshold amount). Control circuitry 304 may update the first index to include data from the second index corresponding to the "Legally Blonde Soundtrack". Control circuitry 304 may present to the user the search results from the second index. As an example, control circuitry 304 may receive a second search for a symbol comprising "50 Cent". Control circuitry 304 will find results in the first index corresponding to they symbol "50 cent". Since control circuitry 304 updated the first index with "Legally Blonde Soundtrack". Control circuitry 304 may receive "Legally Blonde Soundtrack" as a result when searching for "50 cent". Control circuitry 304 may generate for display 312 the results of the search in results box 504. Control circuitry 304 may generate for display the 50 Cent song "In Da Club" 504-1. Control circuitry 304 may also generate for display a plurality of other items from the first index such as the artist "Biggie Smalls" 504-2, the movie "8 Mile" or the dance "Shmoney Dance" as they relate to the search "50 Cent". Control circuitry 304 may also generate for display "Legally Blonde Soundtrack". In this example, the index represents a strong preference for rap, therefore, artists, music and the like, relating to rap will be in the first index. As control circuitry 304 updated the first index to contain data corresponding to the symbol "Legally Blonde Soundtrack" it may now appear in the first tier results. When control circuitry 304 searches for "50 Cent" the first hit may be rapper "50 Cent", as opposed to a 50 cent coin.

Figure 6:
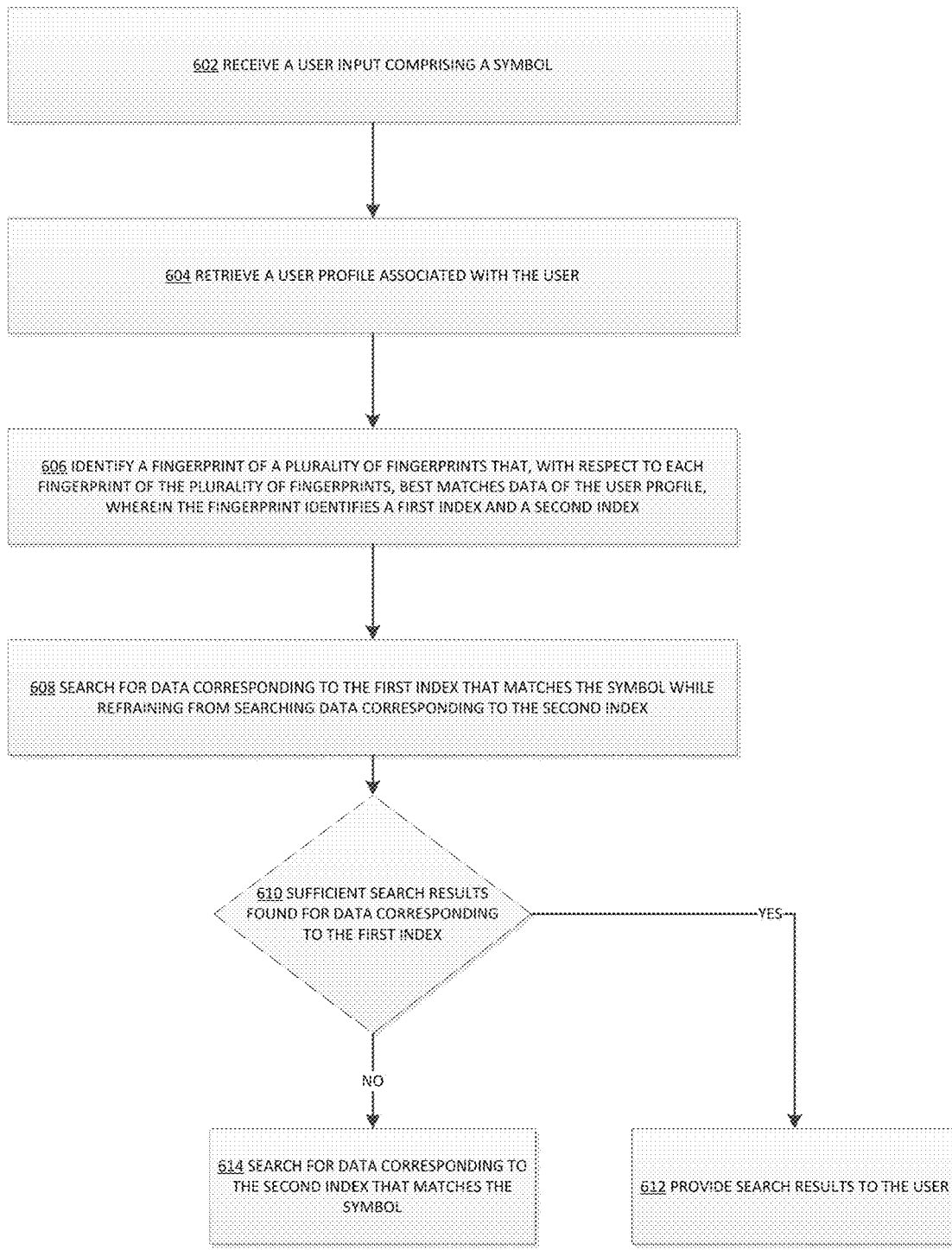
FIG. 6 is a flowchart of illustrative steps involved in retrieving search results from a first index.

FIG. 6. Is a flowchart of illustrative steps involved in providing search results to a user in accordance with some embodiments of the disclosure. It should be noted that process 600 or any step thereof could be performed on, or provided by, any of the devices shown in FIGS. 3-5. For example, process 600 may be executed by control circuitry 304 (FIG. 3) as instructed by control circuitry 304 implemented on user equipment 402, 404, and/or 406 (FIG. 4) in order to determine how to provide search results to the user. In addition, one or more steps of process 600 may be incorporated into or combined with one or more steps of any other process or embodiment.

Process 600 begins at 602, where control circuitry 304 receives a user input comprising a symbol. For example, control circuitry 304 may prompt the user (e.g., via display 312) to input a symbol into search box 502, and may receive the user input of the symbol through user input interface 310 (e.g., by receiving entry of text string, by receiving an input of an image or video by way of a drag and drop operation and the like).

At 604, control circuitry 304 may retrieve a user profile associated with the user. Control circuitry 304 may retrieve the user profile from media guidance data source 418 by transmitting a query to media guidance data source 418 over communication network 414. Media guidance data source 418 may reply to the query by returning the user profile or a pointer to the user profile to control circuitry 304 (e.g., by a message transmitted over communication network 414). Media guidance data source 418 may be located remotely or locally to the user equipment on which control circuitry 304 is implemented.

At 606, control circuitry 304 may identify a database profile of a plurality of database profiles that, with respect to each database profile of the plurality of database profiles, best matches data of the user profile wherein the database profile identifies a first index and a second index. Control circuitry 304 may analyze the user profile and may compute a user database profile for use in comparing the user profile against database profiles in a database (e.g., storage 308 or media guidance data source 418). Database profiles of the plurality of database profiles may represent common user profile traits of a segment of users of the population. Control circuitry 304 may compute the similarity between the user's database profile and the plurality of database profiles stored at the database. Control circuitry 304 may identify a best match database profile of the plurality of database profiles based on the computed similarities. Control circuitry 304 may identify a first and a second index associated with the best match database profile.

At 608, control circuitry 304 searches for data corresponding to the first index that matches the symbol while refraining from searching data corresponding to the second index. Control circuitry 304 may access the first search index corresponding to the identified database profile. Control circuitry 304 may generate a query or multiple queries related to the search symbol for searching data corresponding to the first index that matches the data. Control circuitry 304 may process (e.g., with natural language processing) the search query to generate the queries for the searching only the first index.

At 610, control circuitry 304 determines whether search results found for data corresponding to the first index are sufficient. Control circuitry 304 may, enumerate the number of search results to determine if the number of search results is above a threshold minimum number of search results.

If control circuitry 304 finds sufficient search results at 610, control circuitry 304 provides the results to the user at 612. Control circuitry 304 may present to the user a listing of the results by generating the list for display on display 312. Alternatively, control circuitry 304 may present the user with results by generating an audio signal for output on speakers 314. Control circuitry 304 may present the search results as they are found or may present them after all results corresponding to the first index are found.

If control circuitry 304 does not find sufficient search results by searching data corresponding to the first index at 610, control circuitry 304 may search for data corresponding to the second index that matches the symbol at 614. Control circuitry 304 may generate a query or a plurality of queries related to the search symbol. Control circuitry 304 may present to the user some or all of the generated queries.

It is contemplated that the steps or description of FIG. 6 may be used with any other embodiment of this disclosure.

In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 6.

Figure 7:
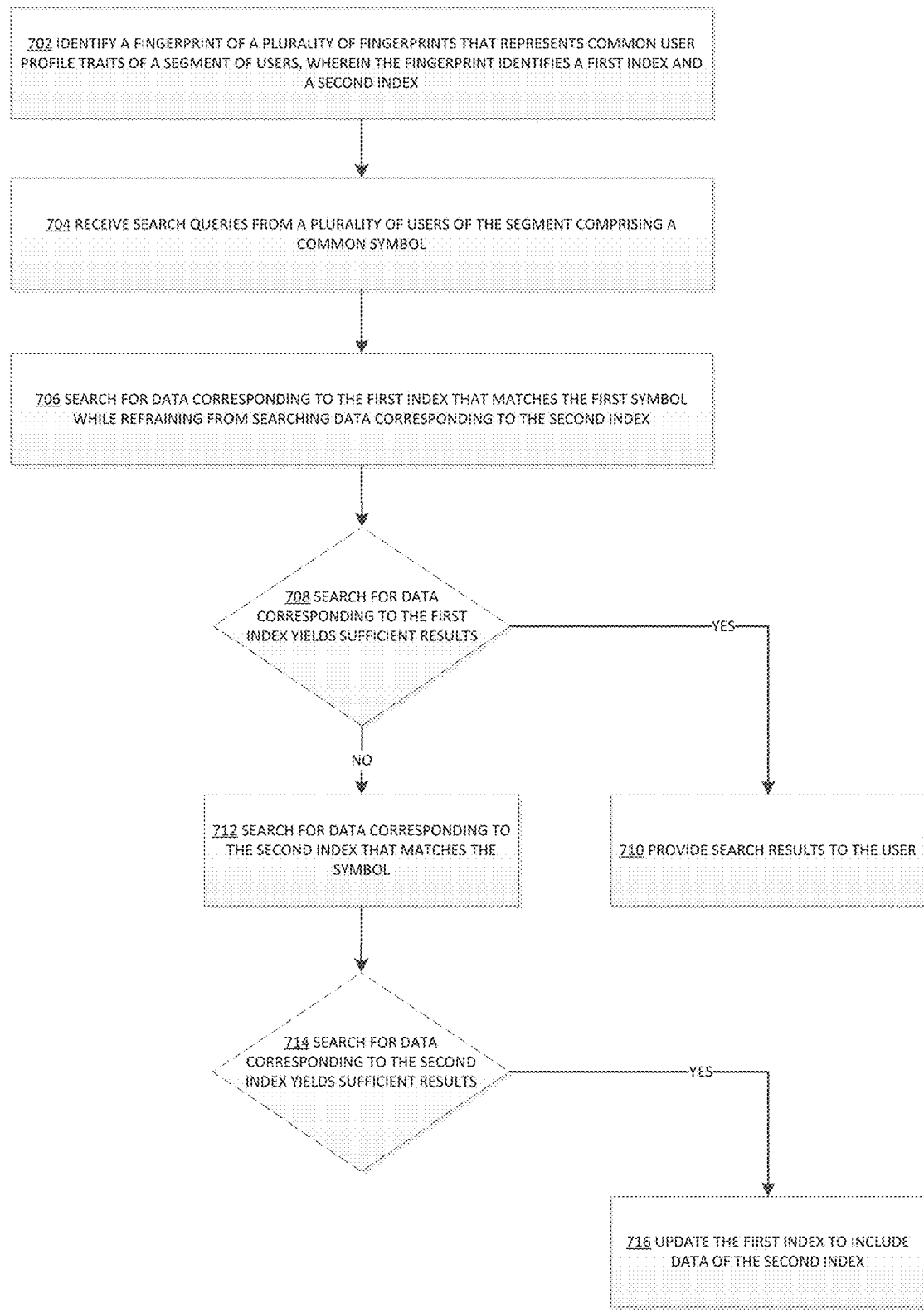
FIG. 7 is a flowchart of illustrative steps involved in retrieving search results from a second index and updating data of the first index.

FIG. 7. Is a flowchart of illustrative steps involved in providing search results to a user in accordance with some embodiments of the disclosure. It should be noted that process 700 or any step thereof could be performed on, or provided by, any of the devices shown in FIGS. 3-5. For example, process 700 may be executed by control circuitry 304 (FIG. 3) as instructed by control circuitry 304 implemented on user equipment 402, 404, and/or 406 (FIG. 4) in order to determine how to provide search results to the user. In addition, one or more steps of process 700 may be incorporated into or combined with one or more steps of any other process or embodiment.

Process 700 begins at 702, where control circuitry 304 identifies a plurality of database profiles that represents common user profile traits of a segment of users, wherein control circuitry 304 can access a first and a second index identified by the database profile. For example, control circuitry 304 may access a local or remote database (i.e., storage 308 or media guidance data source 418) of database profiles. Control circuitry 304 may identify the database profile from the plurality of database profiles based on data received about the database profile, or control circuitry 304 my make a determining as to the identity of the database profile based on the user performing the search. Control circuitry 304 may access the database profiles in response to receiving a search request from a user or to update the indices.

At 704, control circuitry 304 receives search queries from a plurality of users of the segment comprising a common symbol. Control circuitry 304 may receive search queries directly from users of device 500 via user input interface 310 or from queries remote from user equipment device 500 via communications network 414. Control circuitry 304 may receive the search queries by accessing local or remote database of search queries (i.e., storage 308 or media guidance data source 418). Control circuitry 304 may receive a common symbol, such as a symbol "50 Cent" from the plurality of users of the segment. In some embodiments, control circuitry 304 may receive portions of media which control circuitry 304 may identify as a common symbol (e.g., the first 5 seconds of a 50 Cent song, and the last 10 seconds of a 50 cent song) as described in relation to FIG. 5.

At 706, control circuitry 304 may search for data corresponding to the first index that matches the first symbol while refraining for searching data corresponding to the second index. Control circuitry 304 may access the first index of the database profile identified in step 702. Control circuitry 304 may search data associated with the first index matching the search symbol. Control circuitry 304 may process the search symbol to identify the meaning of the query (e.g., by using a natural linguage processing algorithm) as described in relation to FIG. 5. Based on the meaning, control circuitry 304 may generate a plurality of queries containing some or all of the original search query.

If control circuitry 304 determines that the search for data corresponding to the first index yields sufficient results at 708, control circuitry 304 may present the search results to the user at 710. Control circuitry 304 may determine that the search results are sufficient by enumerating the total number of search results and comparing against a threshold minimum number of search results. If the number of search results is greater than the threshold number number, control circuitry 304 may present the results to the user. Control circuitry 304 may present to the user a listing of the search results by generating the list for display 312. Alternatively, control circuitry 304 may present the user with results by generating an audio signal for output on speakers 314. Control circuitry 304 may present the search results as they are found or may present them after all results corresponding to the first index are found.

If control circuitry 304 determines that the search for data corresponding to the first index yields insufficient results at 708, control circuitry 304 may search for data corresponding to the second index that matches the symbol at 712. For example, control circuitry 304 may determine that the number search results returned by the search corresponding to the first index were below a threshold minimum number of results. Control circuitry may then access the second index, identified by the database profile, to perform a search. Control circuitry may perform the search corresponding to the second index in the same or similar manner as the search corresponding to the first index.

If control circuitry 304 determines that the search for data corresponding to the second index yields sufficient results, control circuitry 304 may update the first index to include data of the second index. For example, similar to the searching by control circuitry 304 corresponding to the first index, control circuitry 304 may enumerate the search results found in the search corresponding to the second index to determine if the number of search results is greater than a threshold value representing the number of sufficient searches to the second index before updating the first tier. If true, control circuitry 304 may update the first index to include data of the second index. Control circuitry 304 may identify data corresponding to the search results to be updated to the first index. Control circuitry 304 may update the first index by moving data corresponding to the second index to a data storage location local or remote (e.g., storage 308 or media guidance data source 418) corresponding to the first index. Control circuitry 304 may update pointers in the first index to point to the data that is being updated; likewise, control circuitry 304 may erase pointers corresponding to the data in the second index.

It is contemplated that the steps or description of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-5 could be used to perform one or more of the steps in FIG. 7.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM devices, or a random access memory, such as a hard drive device or a computer diskette, having a computer-readable program code stored thereon. It should also be understood that methods, techniques, and processes involved in the present invention may be executed using processing circuitry. For instance, determination of the degree to which a relative term matches a user profile attribute may be performed by processing circuitry, e.g., by processing circuitry 306 of FIG. 3. The processing circuitry, for instance, may be a general purpose processor, a customized integrated circuit (e.g., an ASIC), or a field-programmable gate array (FPGA) within user equipment 300, media content source 416, or media guidance data source 418. For example, the user profile information as described herein may be stored in, and retrieved from, storage 308 of FIG. 3, or media guidance data source 418 of FIG. 4. Furthermore, processing circuitry, or a computer program, may update settings associated with a user, such as a user-selected first or second threshold, updating the information stored within storage 308 of FIG. 3 or media guidance data source 418 of FIG. 4.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for providing search results to a user, the method comprising:
   receiving a search query comprising a symbol;
   searching for data corresponding to a first database index that matches the symbol;
   in response to determining that the searching for data corresponding to the first database index yields insufficient search results:
      searching for data corresponding to a second database index that matches the symbol;
      determining that the searching for data corresponding to the second database index yields a number of search results that is greater than a first predetermined number;
      incrementing a counter value;
      determining that the counter value corresponds to a second predetermined number; and
      updating the first database index to include data of the second database index.

2. The method of claim 1, further comprising generating for display the results of at least one of the searching for data corresponding to the first database index and searching for data corresponding to the second database index.

3. The method of claim 2, wherein generating for display the search results of at least one of the searching for data corresponding to the first database index and searching for data corresponding to the second database index comprises:
   determining attributes corresponding to each search result of the search results of at least one of the searching for data corresponding to the first database index and searching for data corresponding to the second database index;
   grouping each search result of the search results of at least one of the searching for data corresponding to the first database index and searching for data corresponding to the second database index into a respective group of a plurality of groups based on the attributes of each search result of the search results of at least one of the searching for data corresponding to the first database index and searching for data corresponding to the second database index; and
   generating for display the search results of at least one of the searching for data corresponding to the first database index and searching for data corresponding to the second database index in a manner that is organized based on the plurality of groups.

4. The method of claim 1, further comprising performing the searching for data corresponding to the second database index in parallel to generating for display the search results corresponding to the searching for data corresponding to the first database index.

5. The method of claim 1, further comprising, in response to finding a first search result of the search results corresponding to the searching for data corresponding to the first database index, generating for display the first search result while continuing to perform the searching for data corresponding to the first database index.

6. The method of claim 1, further comprising:
   monitoring symbols received in a plurality of search queries; and
   dynamically modifying the first database index and the second database index based on the monitoring.

7. The method of claim 6, further comprising:
   determining an occurrence of a real-world event;
   determining a plurality of attributes corresponding to the real-world event;
   identifying data in the second database index that corresponds to an attribute of the plurality of attributes; and
   updating the first database index to include the identified data from the second database index.

8. The method of claim 1, further comprising:
   comparing attributes associated with data that has not yet been placed in the first database index or the second database index to attributes associated with a database profile;
   in response to determining that the attributes associated with the data match the attributes associated with the database profile by at least a first predetermined value:
      updating the first database index to include the data; and
   in response to determining that the attributes associated with the data match the attributes associated with the database profile by at least a second predetermined value, wherein the second predetermined value is less than the first predetermined value:
      updating the second database index to include the data.

9. The method of claim 1, further comprising:
   in response to receiving the search query, associating an entry of the first database index that yielded a search result of the search results with a timestamp;
   periodically comparing the timestamp against a predetermined timestamp;
   in response to determining, based on the comparing, that the timestamp is older than the predetermined timestamp, identifying data in the first database index where the timestamp is older than the predetermined timestamp; and
   in response to the identifying:

updating the second database index to include the entry; and deleting the entry from the first database index.

10. The method of claim 1, further comprising identifying a database profile of a plurality of database profiles that represents common user profile traits of a segment of users, wherein the database profile identifies the first database index and the second database index.

11. A system for providing search results to a user, the system comprising:
   user input circuitry;
   communications circuitry; and
   control circuitry configured to:
      receive a search query comprising a symbol;
      search for data corresponding to a first database index that matches the symbol;
      in response to determining that the searching for data corresponding to the first database index yields insufficient search results:
         search for data corresponding to a second database index that matches the symbol;
         determine that searching for data corresponding to the second database index yields a number of search results that is greater than a first predetermined number;
         increment a counter value;
         determine that the counter value corresponds to a second predetermined number; and
         update the first database index to include data of the second database index.

12. The system of claim 11, wherein the control circuitry is further configured to generate for display the results of at least one of the searching for data corresponding to the first database index and searching for data corresponding to the second database index.

13. The system of claim 12, wherein the control circuitry, when generating for display the search results of at least one of the searching for data corresponding to the first database index and searching for data corresponding to the second database index, is further configured to:
   determine attributes corresponding to each search result of the search results of at least one of the searching for data corresponding to the first database index and searching for data corresponding to the second database index;
   group each search result of the search results of at least one of the searching for data corresponding to the first database index and searching for data corresponding to the second database index into a respective group of a plurality of groups based on the attributes of each search result of the search results of at least one of the searching for data corresponding to the first database index and searching for data corresponding to the second database index; and
   generate for display the search results of at least one of the searching for data corresponding to the first database index and searching for data corresponding to the second database index in a manner that is organized based on the plurality of groups.

14. The system of claim 11, wherein the control circuitry is further configured to perform the search for data corresponding to the second database index in parallel to generating for display the search results corresponding to the searching for data corresponding to the first database index.

15. The system of claim 11, wherein the control circuitry is further configured to, in response to finding a first search result of the search results corresponding to the searching for data corresponding to the first database index, generate for display the first search result while continuing to perform the search for data corresponding to the first database index.

16. The system of claim 11, wherein the control circuitry is further configured to:
   monitor symbols received in a plurality of search queries; and
   dynamically modify the first database index and the second database index based on the monitoring.

17. The system of claim 11, wherein the control circuitry is further configured to:
   determine an occurrence of a real-world event;
   determine a plurality of attributes corresponding to the real-world event;
   identify data in the second database index that corresponds to an attribute of the plurality of attributes; and
   update the first database index to include the identified data from the second database index.

18. The system of claim 11, wherein the control circuitry is further configured to:
   compare attributes associated with data that has not yet been placed in the first database index or the second database index to attributes associated with a database profile;
   in response to determining that the attributes associated with the data match the attributes associated with the database profile by at least a first predetermined value:
      update the first database index to include the data; and
   in response to determining that the attributes associated with the data match the attributes associated with the database profile by at least a second predetermined value, wherein the second predetermined value is less than the first predetermined value:
      update the second database index to include the data.

19. The system of claim 11, wherein the control circuitry is further configured to:
   in response to receiving the search query, associate an entry of the first database index that yielded a search result of the search results with a timestamp;
   periodically compare the timestamp against a predetermined timestamp;
   in response to determining, based on the comparing, that the timestamp is older than the predetermined timestamp,
      identify data in the first database index where the timestamp is older than the predetermined timestamp; and
      in response to the identifying:
         update the second database index to include the entry, and
         delete the entry from the first database index.

20. The system of claim 11, wherein the control circuitry is further configured to identify a database profile of a plurality of database profiles that represents common user profile traits of a segment of users, wherein the database profile identifies the first database index and the second database index.

* * * * *